(12) United States Patent
Mertz

(10) Patent No.: US 8,905,457 B2
(45) Date of Patent: Dec. 9, 2014

(54) SLIDING DEVICE, IN PARTICULAR FOR A VEHICLE SUN VISOR, AND SUN VISOR PROVIDED WITH SUCH A DEVICE

(76) Inventor: Patrick Mertz, Neuf-Brisach (FR)

(*) Notice: Subject to any disclaimer, the term of this patent is extended or adjusted under 35 U.S.C. 154(b) by 0 days.

(21) Appl. No.: 13/984,584

(22) PCT Filed: Mar. 29, 2012

(86) PCT No.: PCT/FR2012/000112
§ 371 (c)(1),
(2), (4) Date: Aug. 9, 2013

(87) PCT Pub. No.: WO2012/143622
PCT Pub. Date: Oct. 26, 2012

(65) Prior Publication Data
US 2014/0049066 A1    Feb. 20, 2014

(30) Foreign Application Priority Data

Apr. 21, 2011  (FR) ..................... 11 53464

(51) Int. Cl.
  *B60J 1/02*    (2006.01)
  *B60J 3/02*    (2006.01)
(52) U.S. Cl.
  CPC ............. *B60J 3/0239* (2013.01); *B60J 3/0265* (2013.01)
  USPC ...................................... 296/97.11
(58) Field of Classification Search
  CPC ................................. B60J 3/02; B60J 3/0204
  USPC .............................................. 296/97.11, 97.9
  See application file for complete search history.

(56) References Cited

U.S. PATENT DOCUMENTS

| 6,010,175 | A  |   | 1/2000  | Bodar et al. |
| 6,131,985 | A  | * | 10/2000 | Twietmeyer et al. ...... 296/97.12 |
| 6,612,637 | B1 | * | 9/2003  | Crotty, III ................. 296/97.11 |
| 7,798,551 | B2 |   | 9/2010  | Okazaki et al. |

FOREIGN PATENT DOCUMENTS

| DE | 41 04 032 C1 | 4/1992 |
| EP | 0 881 110 A2 | 12/1998 |
| EP | 2 145 789 A1 | 1/2010 |

OTHER PUBLICATIONS

International Search Report for corresponding PCT/FR2012/000112 mail date May 31, 2012.
Written Opinion for corresponding PCT/FR2012/000112 mail date May 31, 2012.

* cited by examiner

*Primary Examiner* — Lori Lyjak
(74) *Attorney, Agent, or Firm* — Davis & Bujold, PLLC; Michael J. Bujold

(57) ABSTRACT

The sliding device (1), in particular for vehicle sun visor (2), arranged so as to pivot about a rod (3) intended to be connected to a stationary element such as, in particular, the passenger compartment of a vehicle. The sliding device (1) comprises a sliding carriage (4) slidably mounted inside a tubular profile member (6). The sliding carriage (4) and the tubular profile member (6) comprise respectively complementary male and female fitting members with a substantially triangular cross-section that define at least two bearing surfaces of the sliding carriage (4) on the tubular profile member (6) in the direction of the return force of the return member (7). The bearing surfaces are symmetrical and inclined by an angle ($\alpha$) with respect to the longitudinal plane of symmetry (P) of the sliding device (1).

14 Claims, 2 Drawing Sheets

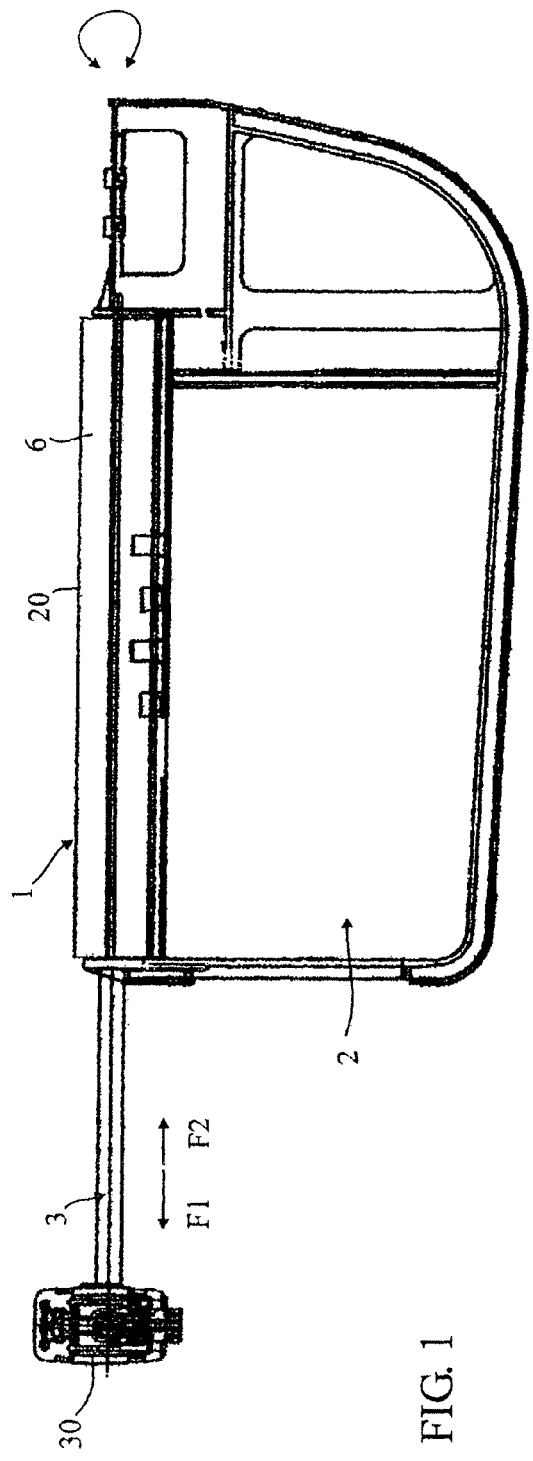
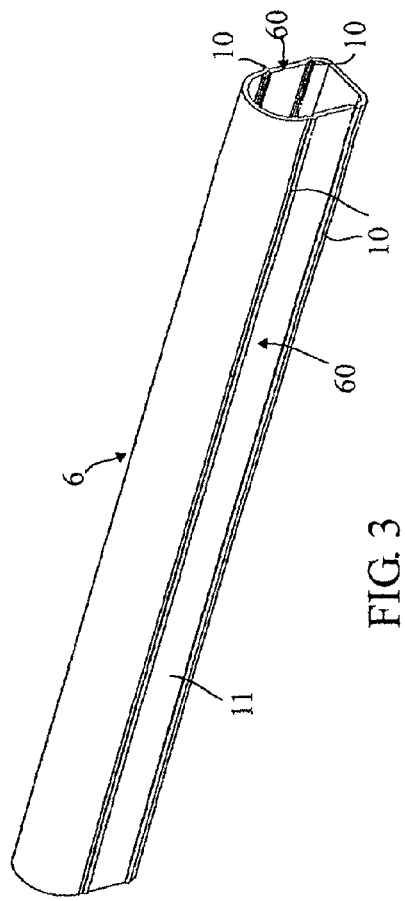
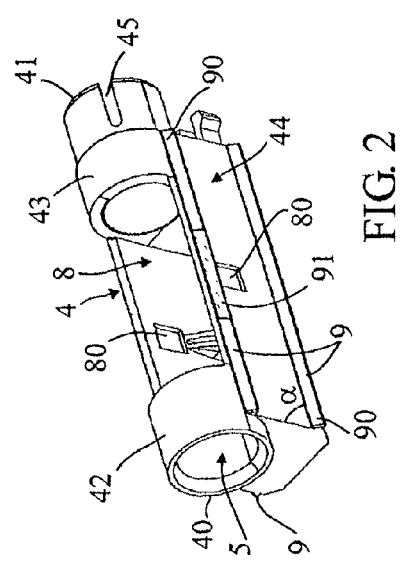

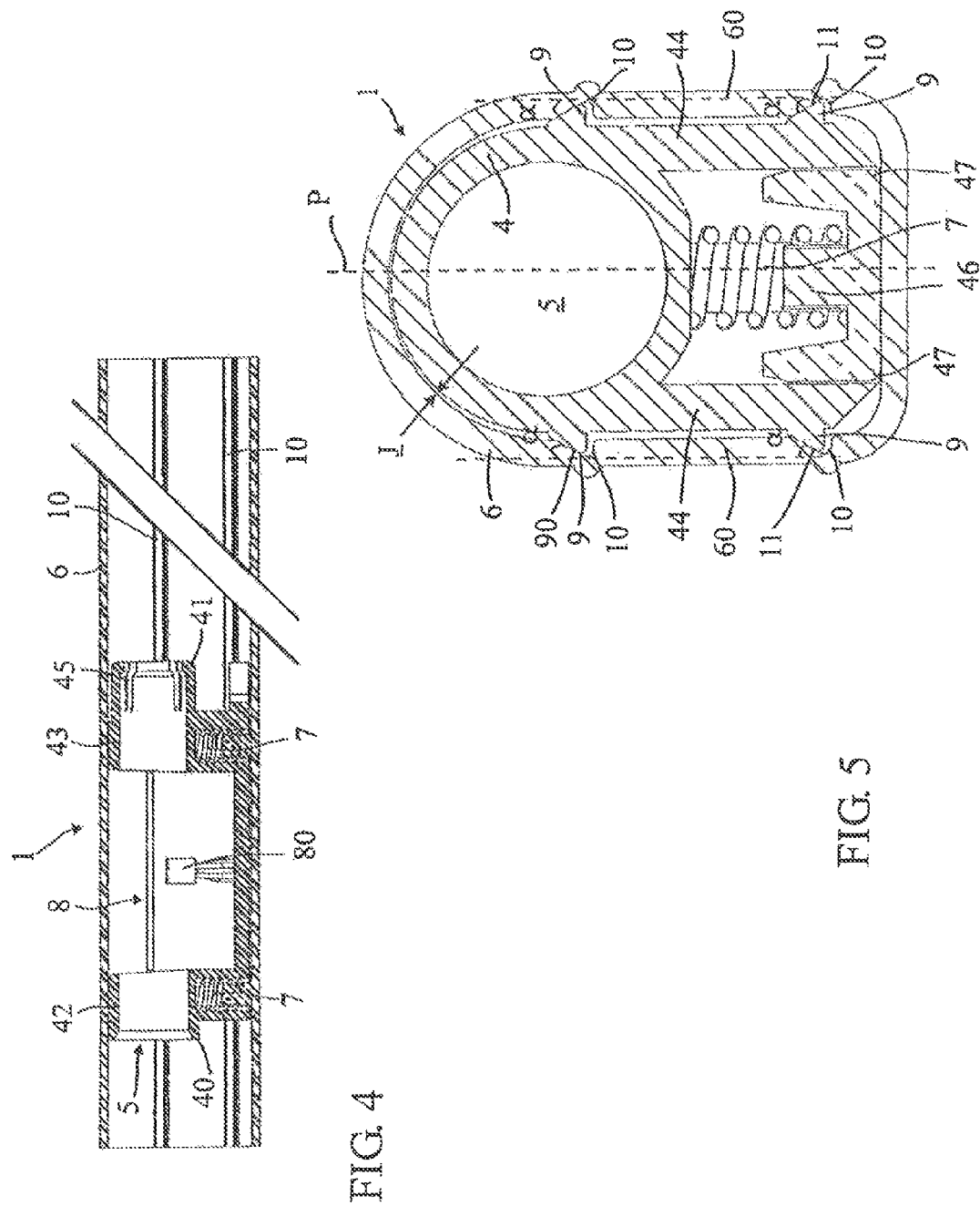

SLIDING DEVICE, IN PARTICULAR FOR A VEHICLE SUN VISOR, AND SUN VISOR PROVIDED WITH SUCH A DEVICE

This application is a national stage completion of PCT/FR2012/000112 filed on Mar. 29, 2012 which claims priority from French application serial no. 11/53464 filed on Apr. 21, 2011.

FIELD OF THE INVENTION

The present invention relates to a sliding device, in particular for vehicle sun visor, arranged so as to pivot about a rod intended to be connected to a stationary element such as, in particular, the passenger compartment of said vehicle, said sliding device comprising a sliding carriage provided with an opening arranged so as to house said rod, said sliding carriage being slidably mounted inside a tubular profile member against which it is pressed by at least one return member.

The invention also relates to a sun visor, in particular for vehicles, arranged so as to pivot about and slide along a rod intended to be connected to a stationary element such as, in particular, the passenger compartment of said vehicle.

BACKGROUND OF THE INVENTION

Such a sliding device is already known and commonly used to equip in particular the sun visors of some high-end vehicles. It has the advantage of increasing the orienting and setting possibilities of such sun visors by allowing, in addition to the pivoting, also the axial displacement.

It is known by a person skilled in the art that such a sliding device has disadvantages linked with the mechanical play that inevitably remains between the sliding carriage and the tubular profile member. Indeed, this play is a source of vibrations and noise that hardly conform to the quality level generally expected from a high-end vehicle and that can show to be very bothersome for the driver.

Document EP 0 881 110, whose subject is a sun visor for a motor vehicle equipped with such a sliding device, solves this problem by manufacturing the sliding carriage out of polyoxymethylene enriched with molybdenum that allows improving its sliding coefficient, and to distribute on its surface bearing elements arranged so as to ensure contact between the sliding carriage and the internal wall of the tubular profile member. Nevertheless, such a solution is not always totally satisfactory. It is constraining from the point of view of the manufacturing process, which requires a two-hour heat-curing stage at a temperature of at least 90° C. for the parts, followed by a cooling stage, in order to achieve a perfect fit between the sliding carriage and the tubular profile member, classically manufactured out of aluminum. On the other hand, it has been noted that the bearing elements, which have only a small contact surface, undergo a rapid wear leading inevitably to the restoration of the mechanical play between the sliding carriage and the tubular profile member, and consequently to the reappearance of the vibrations and of the noise.

SUMMARY OF THE INVENTION

The present invention aims to provide a solution for the above-mentioned problems by offering a sliding device that is easy to manufacture and that includes means allowing to compensate the mechanical play noted between the sliding carriage and the tubular profile member after their assembly, and consequently to reduce or even suppress any vibration and noise generated by such mechanical play, using hard-wearing over time or self-compensating means.

To that purpose, the invention relates to a sliding device of the kind stated in the preamble, characterized in that said sliding carriage and said tubular profile member comprise respectively complementary male and female fitting means with a substantially triangular cross-section, said female fitting means defining at least two bearing surfaces for the sliding carriage on said tubular profile member in the direction of the return force of said return member, said bearing surfaces being symmetrical and inclined by an angle $\alpha$ with respect to the longitudinal plane of symmetry of said sliding device.

In compliance with a preferred embodiment variant of the device according to the invention, said male and female assembly means comprise respectively at least one pair of longitudinal ribs extending each externally along a side wall of said sliding carriage and at least one pair of longitudinal grooves extending each internally along a side wall of the tubular profile member, said longitudinal ribs and said longitudinal grooves being symmetrical to each other with respect to the longitudinal plane of symmetry of said sliding device.

In order to ensure the centering of the sliding carriage and to avoid its inclination with respect to the axis of the sliding device, during its displacement with respect to the tubular profile member, the invention provides preferably that said male and female assembly means comprise respectively two pairs of longitudinal ribs and two pairs of longitudinal grooves, said pairs being distributed on the height of the side walls of said sliding carriage and of said tubular profile member.

According to an additional characteristic, said longitudinal grooves and longitudinal ribs comprise each at least one inclined wall that defines at least one bearing plane, said inclined wall forming with said longitudinal plane of symmetry said angle $\alpha$. In this case, said angle $\alpha$ lies substantially between 20° and 45° and is preferably substantially equal to 30°.

The male and female assembly means are advantageously arranged to ensure a peripheral play between said sliding carriage and said tubular profile member to facilitate their relative displacement.

According to another advantageous characteristic of the present sliding device, said sliding carriage and/or said tubular profile member comprise sliding means arranged so as to facilitate their displacement with respect to each other, such as for example at least one shoe forming the bottom of said sliding carriage or arranged underneath the bottom of said sliding carriage.

As an embodiment variant, the sliding carriage can comprise on at least a section of its longitudinal ribs, at least one area with an excess thickness resting against the longitudinal ribs of the tubular profile member, said area with an excess thickness being preferably located in the median section of the side walls of the sliding carriage.

The invention also relates to a sun visor, in particular for vehicles, arranged so as to pivot about and slide along a rod intended to be connected to a stationary element such as, in particular, the passenger compartment of said vehicle, said sun visor comprising a sliding device as described previously.

BRIEF DESCRIPTION OF THE DRAWINGS

The present invention and its advantages will be better revealed in the following description of an embodiment given as a non limiting example, in reference to the drawings in appendix, in which:

FIG. 1 represents a front view of a sun visor equipped with a sliding device according to the invention, FIGS. 2 and 3 are perspective views, respectively of the sliding carriage and of the tubular profile member included in the device according to the invention, FIG. 4 is an axial cross-section view of a sliding device according to the invention, and FIG. 5 is an enlarged cross-section of sliding device of FIG. 4.

DETAILED DESCRIPTION OF THE DRAWINGS

Referring to the figures, the invention relates to a sliding device 1, in particular for vehicle sun visor 2, arranged so as to allow said sun visor 2 to pivot about a rod 3 connected to the passenger compartment of said vehicle by means of a fastening element 30. This sliding device 1 allows in addition a sliding movement (see FIG. 1, arrows F1, F2) of said sun visor 2 along said rod 3 between a retracted position, in which it is arranged close to fastening element 30, and an extended position, in which it is located away from the latter.

As illustrated in FIGS. 2 to 5, such a sliding device 1 comprises classically a sliding carriage 4 commonly made of plastic material, mounted so as to slide inside of a tubular profile member 6 out of metal such as aluminum, against which it is pressed, in the represented example, by two compression springs 7. Of course, the materials used for manufacturing sliding carriage 4 and tubular profile member 6, as well as the number and kind of springs 7 are given only as examples and could be different, still remaining within the framework of the invention. As it is shown in FIG. 1, the tubular profile member 6 is classically integrated in a longitudinal edge 20 of sun visor 2 and is covered with the external covering of the latter.

Referring to FIG. 2, the sliding carriage 4 is provided at its two ends 40, 41 with two tubular sections 42, 43 that define an opening 5 arranged to house rod 3. Opening 5 is in communication with a housing 8 arranged to receive a spring cage (not represented) including at least one spring (not represented) intended for pressing rod 3 against opening 5 in order to stabilize it there. In the illustrated example, housing 8 includes two openings 80 formed on each of the side walls 44 of sliding carriage 4 and intended to cooperate with elements with a complementary shape such as for example tabs formed on said spring cage to lock it in position inside of said housing 8. On the other hand, the tubular section 43 of opening 5 is provided with a plurality of slots 45 contributing to the assembly between sliding carriage 4 and rod 3.

In compliance with the invention, sliding carriage 4 and tubular profile member 6 comprise respectively complementary male and female fitting means. In the illustrated example, these are defined respectively by two pairs of longitudinal ribs 9 with a triangular cross-section extending each outside along a side wall 44 of sliding carriage 4 and by two pairs of longitudinal grooves 10 with a triangular cross-section extending each inside along a side wall 60 of tubular profile member 6. Said longitudinal ribs 9 and said longitudinal grooves 10 are symmetrical to each other with respect to the longitudinal plane of symmetry P of sliding device 1 and are distributed on the height of side walls 44, 60 of sliding carriage 4 and of tubular profile member 6. Moreover, the longitudinal grooves 10 and longitudinal ribs 9 comprise each at least one wall 11, 90 inclined by an angle α with respect to the longitudinal plane of symmetry P of sliding device 1. In the illustrated example, angle α is substantially equal to 30°, however, any other value lying substantially between 20° and 45° would also be suitable. The inclined walls 11 of the two pairs of longitudinal grooves 10 define thus advantageously four inclined bearing surfaces, symmetrical two by two with respect to the longitudinal plane of symmetry P of sliding device 1, of sliding carriage 4 on tubular profile member 6 in the direction of the return force of springs 7. Of course, the number of longitudinal grooves and ribs 9, 10 could be increased or reduced if necessary, in particular in function of the dimensions of sliding carriage 4 and of tubular profile member 6.

Additionally, and in order to reduce even more the operating play of sliding device 1, the sliding carriage 4 can comprise, on at least a section of its horizontal ribs 9, one or several areas 91 with excess thickness bearing against the longitudinal grooves 10 of tubular profile member 6. These areas 91 with excess thickness are preferably located in the most flexible section of side walls 44 of sliding carriage 4, that is to say the central section of longitudinal ribs 9 located in the upper section of sliding carriage 4 in order to achieve a spring or damping effect and favor any possible play compensation.

The basic configuration of sliding device 1, completed or not with the areas 91 with excess thickness, allows advantageously compensating any possible mechanical play while ensuring perfect guiding and perfect centering of sliding carriage 4 inside of tubular profile member 6 all along the relative displacement of these two parts when sun visor 2 slides between its retracted and extended positions and vice-versa. Moreover, the presence of the different inclined bearing surfaces guarantees the conservation of the axial position of sliding carriage 4 with respect to tubular profile member 6 all along the successive uses of sun visor 2. In particular any unexpected rotation of sliding carriage 4 with respect to tubular profile member 6 that might lead to a wear of the parts and consequently to a deterioration of their cohesion and to the appearance of mechanical play is prevented. Finally, the longitudinal ribs 9 contribute to stiffen sliding carriage 4 and therefore to improve its mechanical solidity. In addition, this configuration allows leaving a peripheral play J between sliding carriage 4 and tubular profile member 6 ensuring a relative displacement between these two parts with a controlled and constant operating force, even in case of the presence of possible residual roughness or surface imperfections between these two parts, which will therefore in no way have an impact on the operation of said device.

According to a additional characteristic of the invention and in the illustrated example, the springs 7 of sliding carriage 4 are held each by a shoe 46 made for example out of a plastic material, whose edges 47 are advantageously rounded in order to facilitate the sliding of tubular profile member 6 with respect to sliding carriage 4.

Of course, such shoes 46 could be replaced with other equivalent sliding means, connected if necessary with sliding carriage 4 and/or tubular profile member 6. A plurality of shoes, for example having the shape of pads arranged underneath the bottom of said sliding carriage 4, could in particular be considered.

On the other hand, sliding carriage 4 and tubular profile member 6 also comprise classically means for limiting the stroke of the sliding movement performed with respect to each other, such as in particular a stroke stop (not represented).

POSSIBILITIES FOR INDUSTRIAL APPLICATION

This description shows clearly that the invention allows reaching the goals defined, that is to say provide a sliding device 1 easy to manufacture and comprising means that allow taking up the manufacturing tolerances between sliding carriage 4 and tubular profile member 6 in order to compensate any mechanical play created between these parts. The presence of complementary male and female fitting means that define inclined bearing surfaces allows reducing or even suppressing the mechanical play, thus avoiding all vibrations and noises.

On the other hand, unlike the existing solutions, which provide to equip the sliding carriage with bearing points that suffer rapid wear, the fitting means according to the invention define bearing surfaces that extend on the whole length of each of the parts, almost free of wear, which allows avoiding the appearance of said vibrations and noises over time.

The present invention is not restricted to the example of embodiment described, but extends to any modification and variant which is obvious to a person skilled in the art while remaining within the scope of the protection defined in the attached claims.

The invention claimed is:

1. A sliding device (1), for a vehicle sun visor (2), arranged so as to pivot about a rod (3) intended to be connected to a stationary element of a vehicle, the sliding device (1) comprising:
 a sliding carriage (4) provided with an opening (5) arranged so as to house the rod (3),
 the sliding carriage (4) being slidably mounted inside a tubular profile member (6) against which the sliding carriage (4) is pressed by at least one return member (7),
 wherein the sliding carriage (4) and the tubular profile member (6) respectively comprise complementary male and female fitting means with a substantially triangular cross-section,
 the female fitting means defining at least two bearing surfaces for sliding carriage (4) on the tubular profile member (6) in a direction of a return force of the return member (7), and
 the bearing surfaces being symmetrical and inclined by an angle with respect to a longitudinal plane of symmetry (P) of the sliding device (1).

2. The sliding device (1) according to claim 1, wherein the male and female assembly means respectively comprise at least one pair of longitudinal ribs (9) extending each externally along a side wall (44) of the sliding carriage (4) and at least one pair of longitudinal grooves (10) extending each internally along a side wall (60) of tubular profile member (6), the longitudinal ribs (9) and the longitudinal grooves (10) are symmetrical with one another with respect to the longitudinal plane of symmetry (P) of the sliding device (1).

3. The sliding device (1) according to claim 2, wherein the male and the female assembly means respectively comprise two pairs of longitudinal ribs (9) and two pairs of longitudinal grooves (10), the pairs being distributed on a height of the side walls (44, 60) of the siding carriage (4) and of the tubular profile member (6).

4. The sliding device (1) according to claim 2, wherein the longitudinal grooves (10) and longitudinal ribs (9) each comprise at least one inclined wall (11, 90) that defines at least one bearing plane, and the inclined wall (11, 90) forms the angle with the longitudinal plane of symmetry (P).

5. The sliding device (1) according to claim 4, wherein the angle is substantially between 20° and 45°.

6. The sliding device (1) according to claim 5, wherein the angle is substantially equal to 30°.

7. The sliding device (1) according to claim 1, wherein at least one the sliding carriage (4) or the tubular profile member (6) comprise sliding means arranged so as to facilitate displacement with respect to one another.

8. The sliding device (1) according to claim 7, wherein the sliding means comprise at least one shoe (46) which either forms a bottom of the sliding carriage (4) or is arranged underneath the bottom of the sliding carriage (4).

9. The sliding device (1) according to claim 1, wherein the male and the female assembly means are arranged to ensure peripheral play (J) between the sliding carriage (4) and the tubular profile member (6).

10. The sliding device (1) according to claim 2, wherein the sliding carriage (4) comprises at least one area (91) with an excess thickness, on a section of at least one the horizontal ribs (9) of the sliding carriage, bearing against the longitudinal grooves (10) of the tubular profile member (6).

11. The sliding device (1) according to claim 10, wherein the area (91) with excess thickness is located in a median section of the side wall (44) of sliding carriage (4).

12. The sliding device (1) according to claim 1, wherein sliding device (1) comprises the sun visor (2).

13. The sliding device (1) according to claim 1, wherein the sun visor (2) is connected to a stationary element located within the passenger compartment of the vehicle.

14. A sliding device (1), for a vehicle sun visor (2), arranged so as to pivot about a rod (3) for connection to a stationary element located within a passenger compartment of a vehicle, the sliding device (1) comprising:
 a sliding carriage (4) provided with an opening (5) arranged so as to house the rod (3),
 the sliding carriage (4) being slidably mounted inside a tubular profile member (6) against which the sliding carriage (4) is pressed by at least one return member (7),
 wherein the sliding carriage (4) and the tubular profile member (6) respectively comprise complementary male and female fitting members having substantially triangular cross-sections,
 the female fitting members defining at least two bearing surfaces for sliding carriage (4) on the tubular profile member (6) in a direction of a return force of the return member (7), and
 the bearing surfaces being symmetrical and inclined by an angle with respect to a longitudinal plane of symmetry (P) of the sliding device (1).

* * * * *